United States Patent
Zhao et al.

(10) Patent No.: US 11,209,538 B2
(45) Date of Patent: Dec. 28, 2021

(54) MILLIMETER-WAVE THREE-DIMENSIONAL HOLOGRAPHIC IMAGING METHOD AND SYSTEM

(71) Applicants: CHINA COMMUNICATION TECHNOLOGY CO., LTD., Shenzhen (CN); SHENZHEN INSTITUTE OF TERAHERTZ TECHNOLOGY AND INNOVATION, Shenzhen (CN)

(72) Inventors: Shukai Zhao, Shenzhen (CN); Lingxia Guo, Shenzhen (CN); Chunchao Qi, Shenzhen (CN); Xiongwei Huang, Shenzhen (CN); Hanjiang Chen, Shenzhen (CN)

(73) Assignee: SHENZHEN INSTITUTE OF TERAHERTZ AND INNOVATION, Shenzhen (CN)

( * ) Notice: Subject to any disclaimer, the term of this patent is extended or adjusted under 35 U.S.C. 154(b) by 363 days.

(21) Appl. No.: 16/327,409

(22) PCT Filed: Aug. 4, 2017

(86) PCT No.: PCT/CN2017/096102
§ 371 (c)(1),
(2) Date: Feb. 22, 2019

(87) PCT Pub. No.: WO2018/036373
PCT Pub. Date: Mar. 1, 2018

(65) Prior Publication Data
US 2019/0196004 A1    Jun. 27, 2019

(30) Foreign Application Priority Data

Aug. 23, 2016 (CN) .......................... 201610709451.1

(51) Int. Cl.
*G01S 13/88* (2006.01)
*G01S 13/34* (2006.01)
(Continued)

(52) U.S. Cl.
CPC ............ *G01S 13/887* (2013.01); *G01S 13/34* (2013.01); *G01S 13/9011* (2013.01); *G01S 13/9088* (2019.05); *G01S 7/356* (2021.05)

(58) Field of Classification Search
CPC .... G01S 13/887; G01S 13/34; G01S 13/9088; G01S 13/9011; G01S 2007/356; G01S 13/9023
(Continued)

(56) References Cited

U.S. PATENT DOCUMENTS 10,877,460 B2 * 12/2020 Wang ................... G05B 19/414
2008/0100510 A1 * 5/2008 Bonthron ............. H01Q 21/061
342/373

(Continued)

FOREIGN PATENT DOCUMENTS

CN          102520402       6/2012
CN          104515989       4/2015
(Continued)

*Primary Examiner* — Vladimir Magloire
*Assistant Examiner* — Alexander L. Syrkin
(74) *Attorney, Agent, or Firm* — Maier & Maier, PLLC (57) ABSTRACT

A millimeter-wave three-dimensional holographic imaging method and system. The method comprises: transmitting a continuous frequency wave to a measured human body, and receiving an echo signal reflected back; performing Fourier transform, phase compensation, inverse Fourier transform, and "non-uniform sampling to uniform sampling" interpolation; and projecting three-dimensional echo data to obtain two-dimensional reconstruction data, and generating a two-dimensional reconstructed image.

4 Claims, 5 Drawing Sheets

(51) Int. Cl.
*G01S 13/90* (2006.01)
*G01S 7/35* (2006.01)

(58) Field of Classification Search
USPC .......................................................... 342/22
See application file for complete search history.

(56) References Cited

U.S. PATENT DOCUMENTS

2011/0254943 A1* 10/2011 Ozinsky ............. G01N 21/6458
348/79
2014/0111374 A1* 4/2014 Case ................... G01S 13/9011
342/25 F

FOREIGN PATENT DOCUMENTS

| CN | 105510912 | | 4/2016 | |
| --- | --- | --- | --- | --- |
| CN | 105510912 A | * | 4/2016 | .......... G01S 13/9011 |
| CN | 105699494 | | 6/2016 | |
| CN | 106338732 | | 1/2017 | |

* cited by examiner

MILLIMETER-WAVE THREE-DIMENSIONAL HOLOGRAPHIC IMAGING METHOD AND SYSTEM

CROSS-REFERENCE TO RELATED APPLICATIONS

This application is a National Stage Entry under 35 U.S.C. 371 of PCT Application No. PCT/CN2017/096102, filed Aug. 4, 2017, which claims priority to Chinese Patent Application No. 201610709451.1, filed Aug. 23, 2016, the entire contents of each of which are incorporated herein by reference.

TECHNICAL FIELD

The disclosure relates to the technical field of millimeter-wave imaging, and particularly relates to a millimeter-wave three-dimensional holographic imaging method and system.

BACKGROUND

The threat of terrorism has become increasingly severe for the past few years, especially in crowded public places. Terrorist attacks run counter to the peaceful development of the world and pose an immeasurable threat to the personal safety of people of all countries.

Security problems in crowded public places like customs, airports and railway stations have attracted more and more attention from all over the world, which also puts forward stricter requirements on the detection scope, accuracy, intelligence, and detection efficiency of security inspection systems.

A traditional security inspection system mainly comprises a metal detector for human body detection and an X-ray imaging system for luggage detection and scanning. The metal detector can effectively detect banned metal items such as guns, metals and daggers carried by human bodies, but can do nothing for high-tech modern dangerous goods such as liquid bombs, biochemical weapons and ceramic knives. The X-ray imaging system can effectively inspect all kinds of dangerous goods, but due to the ionizing properties of X-rays which are harmful to human bodies, the X-ray imaging system cannot be used for security inspection of human bodies.

Millimeter-wave, as an electromagnetic wave of millimeter magnitude, has a wavelength between the wave bands of far infrared wave and microwave. Although its imaging spatial resolution needs to be improved compared with infrared wave and visible light, the electromagnetic wave based on this wave band can penetrate plasma, dust, smoke and most clothes, making its working time unlimited. In addition, compared with microwave with longer wavelength, a millimeter-wave system has much higher detection accuracy under a certain antenna beam width. Meanwhile, millimeter-wave can image hidden objects through ordinary clothes, and electromagnetic waves within the millimeter-wave band range will not cause harm to human bodies, making it easier for the public to accept; in addition, it also makes up for the defect that the metal detector cannot detect and identify nonmetallic objects such as plastics, liquid explosives, drugs and ceramic daggers.

Millimeter-wave has been studied for more than a hundred years, and an active three-dimensional imaging security inspection device has been developed for human body security inspection. The inspection device can effectively detect various dangerous and banned items carried by people without doing harm to human bodies.

In order to improve the resolution ability of the system to a detection target and obtain more target information, a millimeter-wave signal with a certain bandwidth is usually transmitted, a scattered signal of the target is received through a receiving antenna, and finally a reconstructed image is obtained by processing the received echo data. In a traditional imaging algorithm, a maximum projection method is generally used to image the received bandwidth echo data. This algorithm can reflect the scattering characteristics of different detected targets to a certain extent, so as to distinguish a human body from foreign matter carried by the human body, however, when the scattering characteristic of the foreign matter carried by the human body is close to that of the human body, the foreign matter carried by the human body cannot be accurately identified, so some articles may go undetected.

BRIEF SUMMARY OF THE INVENTION

Disclosed embodiments include a millimeter-wave three-dimensional holographic imaging method that may be able to detect articles when the scattering characteristic of foreign matter carried by a human body is close to that of the human body, which conventional methods cannot accurately identify.

In accordance with an embodiment of the disclosure, the millimeter-wave three-dimensional holographic imaging method comprises:

transmitting a continuous frequency wave to a measured human body by using a millimeter-wave antenna array, and receiving an echo signal $S(t, \theta, z)$ reflected back by the measured human body;

performing Fourier transform on the echo signal along a time direction to obtain an echo signal $S(\omega, \theta, z)$ in a frequency domain;

performing two-dimensional Fourier transform on the echo signal in the frequency domain along an angle $\theta$ and a vertical direction z to obtain an echo signal $S(\omega, \xi, k_z)$ in a spatial wave number domain;

performing phase compensation on the echo signal in the spatial wave number domain;

performing one-dimensional inverse Fourier transform on the echo signal after the phase compensation along the $\theta$ direction to obtain sampling data in the spatial wave number domain;

performing "non-uniform sampling to uniform sampling" interpolation on the sampling data in the spatial wave number domain to obtain echo data evenly distributed in the spatial wave number domain;

performing three-dimensional inverse Fourier transform on the echo data evenly distributed in the spatial wave number domain to obtain three-dimensional echo data; and projecting the three-dimensional echo data in a quasi standard deviation manner to obtain two-dimensional reconstruction data, and generating a two-dimensional image.

Based on the technical scheme, the step of transmitting the continuous frequency wave to the measured human body by using the millimeter-wave antenna array, and receiving the echo signal $S(t, \theta, z)$ reflected back by the measured human body comprises:

transmitting the continuous frequency wave to the measured human body by using a millimeter-wave antenna array with a cylindrical synthetic aperture, and receiving the echo signal $S(t \theta, z)$ reflected back by the measured human body.

Based on the technical scheme, the step of performing phase compensation on the echo signal in the spatial wave number domain comprises:

multiplying the echo signal $S(\omega, \xi, k_z)$ in the spatial wave number domain by a phase compensation factor $\exp(-j\sqrt{4k_r^2R^2-\xi^2})$ to obtain a compensated echo signal, wherein R is a scanning radius of the millimeter-wave antenna array with the cylindrical synthetic aperture.

Based on the technical scheme, the step of projecting the three-dimensional image in the quasi standard deviation manner to obtain the two-dimensional reconstructed image comprises:

if the continuous frequency wave transmitted to the measured human body by the millimeter-wave antenna array is a stepped frequency continuous wave signal, the number of frequency points is Nf, a scattering intensity signal of the measured target received at each frequency point by the nth antenna in the mth row in the millimeter-wave antenna array is $I_{mni}$, and the statistical average value of scattering intensity of millimeter-wave signals at corresponding frequency points by the human body is $\overline{T_i}$, then projecting a scattering intensity signal of the measured target received at each frequency point by the nth antenna in the mth row according to the following standard deviation projection formula:

$$I_{mn} = \sqrt{\frac{1}{Nf}\sum_{i=1}^{Nf}(I_{mn_i} - \overline{T_i})^2};$$

and combining $I_{mn}$ obtained by the projection of all antennas in the millimeter-wave antenna array to obtain the two-dimensional reconstructed image.

Based on the technical scheme, after projecting the three-dimensional image in the quasi standard deviation manner to obtain the two-dimensional reconstructed image, the method further comprises:

identifying whether the measured human body is carrying foreign matter according to the two-dimensional reconstructed image.

In accordance with an embodiment of the disclosure, a millimeter-wave three-dimensional holographic imaging system comprises:

an echo signal acquisition unit for transmitting a continuous frequency wave to a measured human body by using a millimeter-wave antenna array, and receiving an echo signal $S(t, \theta, z)$ reflected back by the measured human body;

a first Fourier transform unit for performing Fourier transform on the echo signal along a time direction to obtain an echo signal $S(\omega, \theta, z)$ in a frequency domain;

a second Fourier transform unit for performing two-dimensional Fourier transform on the echo signal in the frequency domain along an angle $\theta$ and a vertical direction z to obtain an echo signal $S(\omega, \xi, k_z)$ in a spatial wave number domain;

a phase compensation unit for performing phase compensation on the echo signal in the spatial wave number domain;

a first inverse Fourier transform unit for performing one-dimensional inverse Fourier transform on the echo signal after the phase compensation along the $\theta$ direction to obtain sampling data in the spatial wave number domain;

an interpolation unit for performing "non-uniform sampling to uniform sampling" interpolation on the sampling data in the spatial wave number domain to obtain echo data evenly distributed in the spatial wave number domain;

a second inverse Fourier transform unit for performing three-dimensional inverse Fourier transform on the echo data evenly distributed in the spatial wave number domain to obtain three-dimensional echo data; and a two-dimensional image reconstruction unit for projecting the three-dimensional echo data in a quasi standard deviation manner to obtain two-dimensional reconstruction data, and generating a two-dimensional image.

Based on the technical scheme, the echo signal acquisition unit is configured for:

transmitting the continuous frequency wave to the measured human body by using a millimeter-wave antenna array with a cylindrical synthetic aperture, and receiving the echo signal $S(t, \theta, z)$ reflected back by the measured human body.

Based on the technical scheme, the phase compensation unit is configured for:

multiplying the echo signal $S(\omega, \xi, k_z)$ in the spatial wave number domain by a phase compensation factor $\exp(-j\sqrt{4k_r^2R^2-\xi^2})$ to obtain a compensated echo signal, wherein R is a scanning radius of the millimeter-wave antenna array with the cylindrical synthetic aperture.

Based on the technical scheme, the two-dimensional image reconstruction unit is configured for:

if the continuous frequency wave transmitted to the measured human body by the millimeter-wave antenna array is a stepped frequency continuous wave signal, the number of frequency points is Nf, a scattering intensity signal of the measured target received at each frequency point by the nth antenna in the mth row in the millimeter-wave antenna array is $I_{mni}$, and the statistical average value of scattering intensity of millimeter-wave signals at corresponding frequency points by the human body is $\overline{T_i}$, then projecting a scattering intensity signal of the measured target received at each frequency point by the nth antenna in the mth row according to the following standard deviation projection formula:

$$I_{mn} = \sqrt{\frac{1}{Nf}\sum_{i=1}^{Nf}(I_{mn_i} - \overline{T_i})^2};$$

and combining $I_{mn}$ obtained by the projection of all antennas in the millimeter-wave antenna array to obtain the two-dimensional reconstructed image.

Based on the technical scheme, the system further comprises:

a foreign matter identification unit for identifying whether the measured human body is carrying foreign matter according to the two-dimensional reconstructed image.

The millimeter-wave three-dimensional holographic imaging method and system in accordance with embodiments of the disclosure may have the following beneficial effects.

In accordance with an embodiment of the disclosure, by transmitting the continuous frequency wave to the measured human body by using the millimeter-wave antenna array, and receiving the echo signal $S(t, \theta, z)$ reflected back by the measured human body; performing Fourier transform on the echo signal along the time direction to obtain the echo signal $S(\omega, \theta, z)$ in the frequency domain; performing two-dimensional Fourier transform on the echo signal in the frequency domain along the angle $\theta$ and the vertical direction z to obtain the echo signal $S(\omega, \xi, k_z)$ in the spatial wave number domain; performing phase compensation on the echo signal in the spatial wave number domain; performing one-dimensional inverse Fourier transform on the echo signal after the phase compensation along the θ direction to obtain the sampling data in the spatial wave number domain; performing "non-uniform sampling to uniform sampling" interpolation on the sampling data in the spatial wave number domain to obtain the echo data evenly distributed in the spatial wave number domain; performing three-dimensional inverse Fourier transform on the echo data evenly distributed in the spatial wave number domain to obtain the three-dimensional echo data; and projecting the three-dimensional echo data in the quasi standard deviation manner to obtain the two-dimensional reconstruction data, and generating the two-dimensional reconstructed image, the scattering characteristic information of banned items carried by the human body may be highlighted on the premise of weakening the scattering information of the human body, and the missed detection rate of banned items may be greatly reduced.

DETAILED DESCRIPTION OF THE INVENTION

In order to make the object, technical scheme and advantages of the disclosure clearer, exemplary embodiments of the disclosure will be described in further detail below with reference to the drawings and features of the embodiments. It should be understood that the exemplary embodiments described herein are only used for illustrative purposes and are not intended to limit the disclosure.

Figure 1:
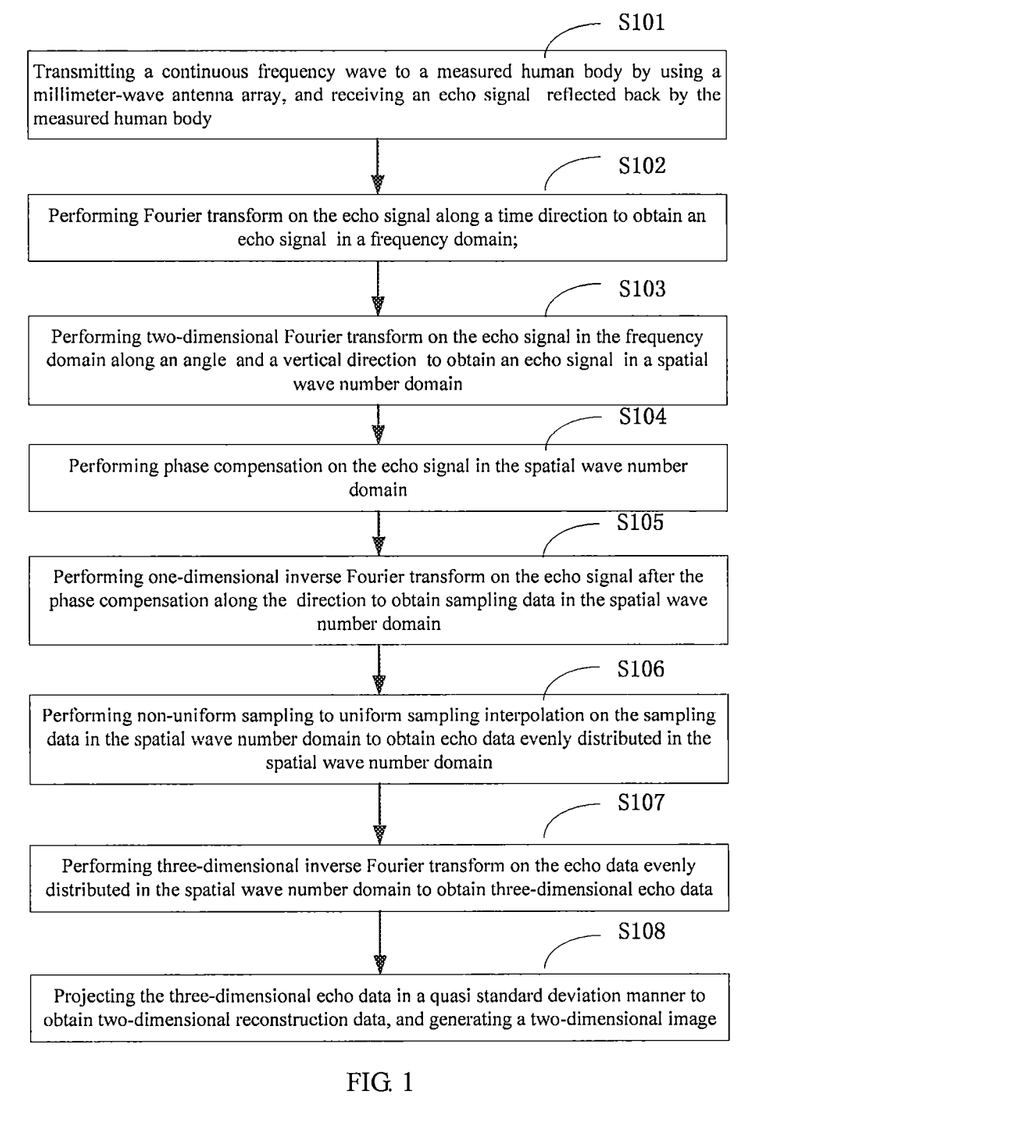
FIG. 1 is a schematic flow chart of a millimeter-wave three-dimensional holographic imaging method provided by an embodiment of the disclosure.

FIG. 1 is a schematic flow chart of a millimeter-wave three-dimensional holographic imaging method in accordance with an embodiment of the disclosure. As shown in FIG. 1, the millimeter-wave three-dimensional holographic imaging method provided by the present embodiment may comprise:

in S101, transmitting a continuous frequency wave to a measured human body by using a millimeter-wave antenna array, and receiving an echo signal S(t θ, z) reflected back by the measured human body.

In the present embodiment, S101 specifically comprises: transmitting the continuous frequency wave to the measured human body by using a millimeter-wave antenna array with a cylindrical synthetic aperture, and receiving the echo signal S(t, θ, z) reflected back by the measured human body.

Figure 2:
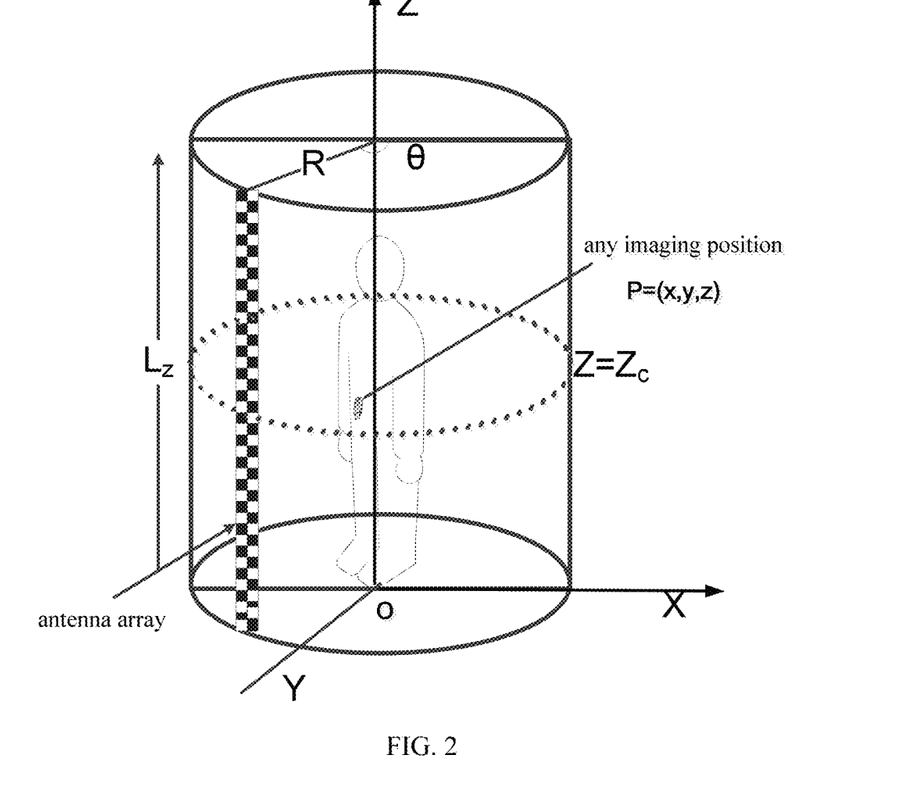
FIG. 2 is a schematic diagram of three-dimensional holographic imaging using a millimeter-wave antenna array with a cylindrical synthetic aperture in an embodiment of the disclosure.

FIG. 2 is a schematic diagram of three-dimensional holographic imaging using a millimeter-wave antenna array with a cylindrical synthetic aperture in accordance with an embodiment of the disclosure.

As shown in FIG. 2, the human body is located at a center O point of a rectangular coordinate system, an axis center of the human body is assumed to coincide with a z axis, and an imaging region of the human body is defined as a $(X_0, Y_0, Z_0) = (R_0 \cos \varphi, R_0 \sin \varphi, Z_0)$ cylinder, wherein $R_0$ is a radius of a region to be imaged, $\varphi \in [0, 2\pi)$. A length of the antenna array is defined as $L_Z$, then a length of the synthetic aperture along the z axis is $L_Z$, and a center of the aperture is located on a plane where $z = Z_C$. The antenna array rotates around the axis center of the human body by a radius of R to form the synthetic aperture in a circumferential θ direction. A sampling position is defined as $(R, \theta, Z)$ the coordinates of any imaging position P of the human body is $(x, y, z)$, and corresponding scattering intensity is $\sigma(x, y, z)$. P(t) is defined as a signal emitted by an antenna, a radiation pattern of the antenna is assumed to be invariable in a bunching target region, and then an echo signal of a P point in a time domain (t, θ, z) is measured to be:

$$S(t, \theta, z) = \int\int\int \sigma(x, y, z) \cdot p\left(t - \frac{2\sqrt{(x - R\cos\theta)^2 + (y - R\sin\theta)^2 + (Z_c - z - Z)^2}}{c}\right) dx\, dy\, dz; \quad (1)$$

In S102, performing Fourier transform on the echo signal along a time direction to obtain an echo signal $S(\omega, \theta, z)$ in a frequency domain.

In the present embodiment, the following formula (2) is obtained by performing Fourier transform on the formula (1) along the time t direction:

$$S(\omega, \theta, z) = \iiint \sigma(x, y, z) \cdot \exp(-j2k_\omega \sqrt{(R\cos\theta - x)^2 + (R\sin\theta - y)^2 + (Z_c - Z - z)^2})\, dx\, dy\, dz \quad (2)$$

wherein $k_\omega = \omega/c$ wave number. In reality, an echo signal of a target is the accumulation of multiple target echo signals in an imaging region, and as a signal amplitude value has little influence on image focusing, the attenuation of signal amplitude with distance is ignored here.

In S103, performing two-dimensional Fourier transform on the echo signal in the frequency domain along an angle θ and a vertical direction z to obtain an echo signal $S(\omega, \xi, k_z)$ in a spatial wave number domain.

In the present embodiment, an exponential term in formula (2) is of a spherical wave signal form, which can be resolved into a plane wave signal form, $Z_C - Z = Z'$ is defined, and the resolution of a spherical wave signal may be considered as the accumulation of plane wave signals emitted by a target located at a point (x, y, z). A dispersion relation of plane wave components is:

$$k_x^2 + k_y^2 + k_z^2 = (2k_\omega)^2;$$

wherein $k_x$, $k_y$ and $k_z$ are wave number components of $k_\omega$ along a coordinate axis in the spatial wave number domain. A $k_r$ wave number component is defined in a plane X-Y to be:

$$k_r = \sqrt{k_x^2 + k_y^2} = \sqrt{4k_\omega^2 - k_z^2};$$

a Fourier transform pair $\sigma(x, y, z) \Leftrightarrow F_\sigma(2k_r \cos \varphi, 2k_r \sin \varphi, k_z)$ is designed, based on the above formulas:

$$S(\omega, \theta, z) = \iint \exp(j2k_r R \cos(\theta - \varphi)) \cdot F_\sigma(2k_r \cos \varphi, 2k_r \sin \varphi, k_z) \exp(jk_z z')\, d\varphi\, dk_z, \quad (3);$$

then two-dimensional Fourier transform is performed on formula (3) along the angle θ and the vertical direction z to obtain the echo signal $S(\omega, \xi, k_z)$ in the spatial wave number domain. In addition, in the present embodiment, $\theta$ is replaced with $\zeta$ when Fourier transform is performed on the echo signal along the $\theta$ direction, and the difference between z and Z' is ignored when one-dimensional Fourier transform is performed in the z direction.

In S104, performing phase compensation on the echo signal in the spatial wave number domain.

In the present embodiment, S104 specifically comprises:

multiplying the echo signal $S(\omega, \xi, k_z)$ in the spatial wave number domain by a phase compensation factor $\exp(-j\sqrt{4k_r^2R^2-\xi^2})$ to obtain a compensated echo signal $S(\omega, \xi, k_z)\exp(-j\sqrt{4k_r^2R^2-\xi^2})$, wherein R is a scanning radius of the millimeter-wave antenna array with the cylindrical synthetic aperture.

In S105, performing one-dimensional inverse Fourier transform on the echo signal after the phase compensation along the $\theta$ direction to obtain sampling data in the spatial wave number domain.

In the present embodiment, formula (4) can be obtained by performing one-dimensional inverse Fourier transform on the echo signal after the phase compensation along the $\theta$ direction:

$$F_\sigma(2k_r\cos\theta, 2k_r\sin\theta, k_z) = F_{(\xi)}^{-1}[S(\omega,\xi,k_z)\exp(-j\sqrt{4k_r^2R^2-\xi^2})] \quad (4);$$

wherein $2k_r\cos\theta = k_x$, $2k_r\sin\theta = k_y$.

In S106, performing "non-uniform sampling to uniform sampling" interpolation on the sampling data in the spatial wave number domain to obtain echo data evenly distributed in the spatial wave number domain.

In the present embodiment, since the sampling data in the spatial wave number domain is non-uniformly distributed, it is necessary to perform "non-uniform sampling to uniform sampling" interpolation in a spatial wave number domain $(k_x, k_y, k_z)$ before calculating final three-dimensional Fourier transform to obtain the scattering intensity of the target in the rectangular coordinate system.

In S107 performing three-dimensional inverse Fourier transform on the echo data evenly distributed in the spatial wave number domain to obtain three-dimensional echo data.

In the present embodiment, the scattering intensity of the target in the rectangular coordinate system can be obtained by performing three-dimensional inverse Fourier transform on the echo data uniformly distributed in the spatial wave number domain $(k_x, k_y, k_z)$ obtained after interpolation:

$$\sigma(x,y,z) = F_{k_x,k_y,k_z}^{-1}\{F_{(\xi)}^{-1}[S(\omega,\xi,k_z)\exp(-j\sqrt{4k_r^2R^2-\xi^2})]\}$$

In S108, projecting the three-dimensional echo data in a quasi standard deviation manner to obtain two-dimensional reconstruction data, and generating a two-dimensional reconstructed image.

In the present embodiment, for the obtained scattering intensity of the target containing three-dimensional image information, it is necessary to project it first to obtain two-dimensional image data and generate the two-dimensional image, and then detect and identify banned items carried by the human body by processing the two-dimensional image. Since different objects have different scattering characteristics for millimeter-waves at different frequency points, in order to highlight the scattering information of foreign matter carried by the human body to the greatest extent when projecting the three-dimensional image data into the two-dimensional data, the quasi standard deviation projection method is adopted here to enhance the scattering information intensity of foreign matter on the premise of weakening the scattering information of the human body, specifically:

if the continuous frequency wave transmitted to the measured human body by the millimeter-wave antenna array is a stepped frequency continuous wave signal, the number of frequency points is Nf, a scattering intensity signal of the measured target received at each frequency point by the nth antenna in the mth row in the millimeter-wave antenna array is $I_{mni}$, and the statistical average value of scattering intensity of millimeter-wave signals at corresponding frequency points by the human body is $T_i$, then projecting a scattering intensity signal of the measured target received at each frequency point by the nth antenna in the mth row according to the following standard deviation projection formula:

$$I_{mn} = \sqrt{\frac{1}{Nf}\sum_{i=1}^{Nf}(I_{mn_i} - T_i)^2};$$

and combining $I_{mn}$ obtained by the projection of all antennas in the millimeter-wave antenna array to obtain the two-dimensional reconstructed image.

Figure 3:
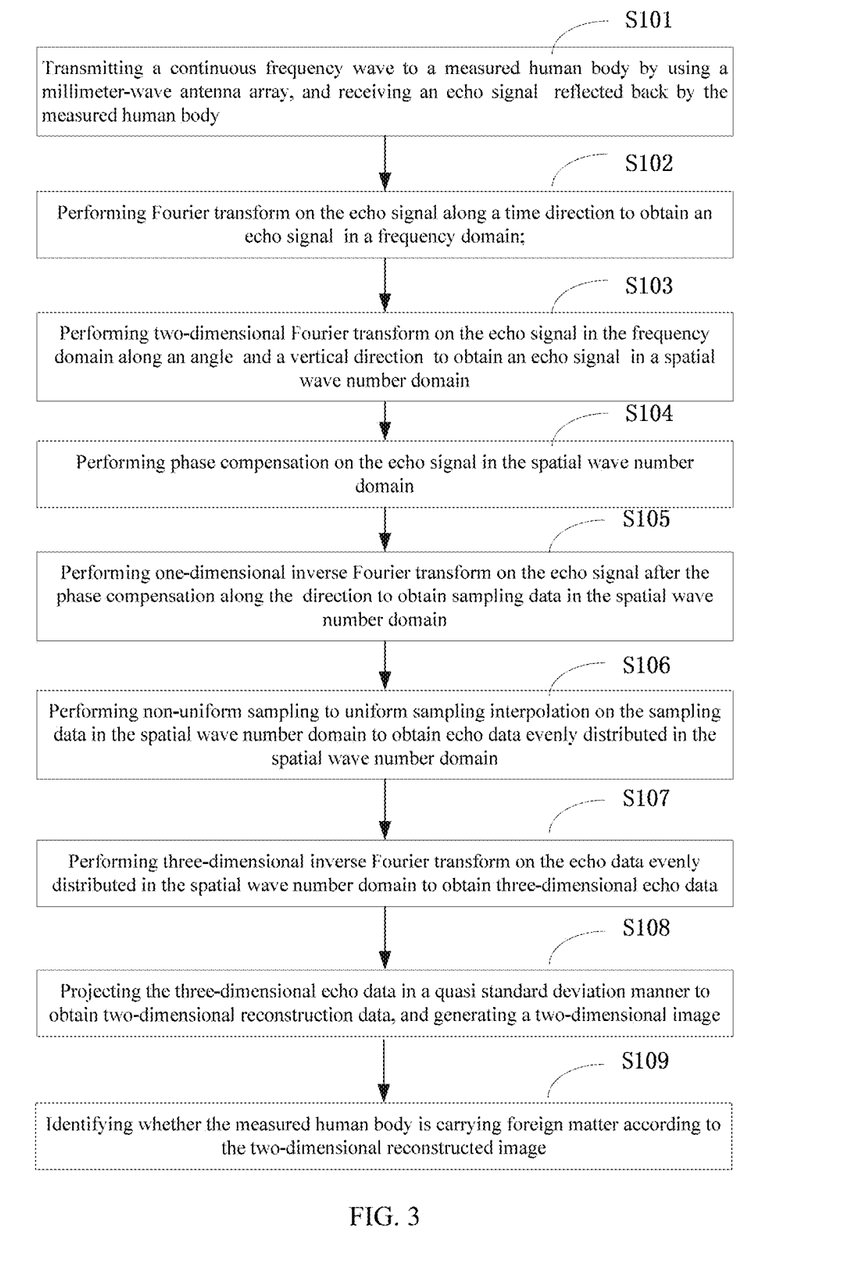
FIG. 3 is a schematic flow chart of a millimeter-wave three-dimensional holographic imaging method provided by another embodiment of the disclosure.

Further, referring to FIG. 3, in another embodiment, after S108, the method may further comprise:

in S109, identifying whether the measured human body is carrying foreign matter according to the two-dimensional reconstructed image.

In the present embodiment, since the two-dimensional reconstructed image obtained by adopting the quasi standard deviation projection method can highlight the image information of foreign matter carried by the human body, weaken the interference of the information of the human body itself, and enhance the contrast between foreign matter and the human body in the image, identification and detection of foreign matter can be better achieved, and the situation that banned items are undetected can be avoided to a certain extent.

As can be seen from the millimeter-wave three-dimensional holographic imaging method according to an embodiment of the disclosure, by transmitting the continuous frequency wave to the measured human body by using the millimeter-wave antenna array, and receiving the echo signal $S(t, \theta, z)$ reflected back by the measured human body; performing Fourier transform on the echo signal along the time direction to obtain the echo signal $S(\omega, \theta, z)$ in the frequency domain; performing two-dimensional Fourier transform on the echo signal in the frequency domain along the angle $\theta$ and the vertical direction z to obtain the echo signal $S(\omega, \xi, k_z)$ in the spatial wave number domain; performing phase compensation on the echo signal in the spatial wave number domain; performing one-dimensional inverse Fourier transform on the echo signal after the phase compensation along the $\theta$ direction to obtain the sampling data in the spatial wave number domain; performing "non-uniform sampling to uniform sampling" interpolation on the sampling data in the spatial wave number domain to obtain the echo data evenly distributed in the spatial wave number domain; performing three-dimensional inverse Fourier transform on the echo data evenly distributed in the spatial wave number domain to obtain the three-dimensional echo data; and projecting the three-dimensional echo data in the quasi standard deviation manner to obtain the two-dimensional reconstruction data, and generating the two-dimensional reconstructed image, the scattering characteristic information of banned items carried by the human body may be highlighted on the premise of weakening the scattering information of the human body, and the missed detection rate of banned items may be greatly reduced to a certain extent.

Figure 4:
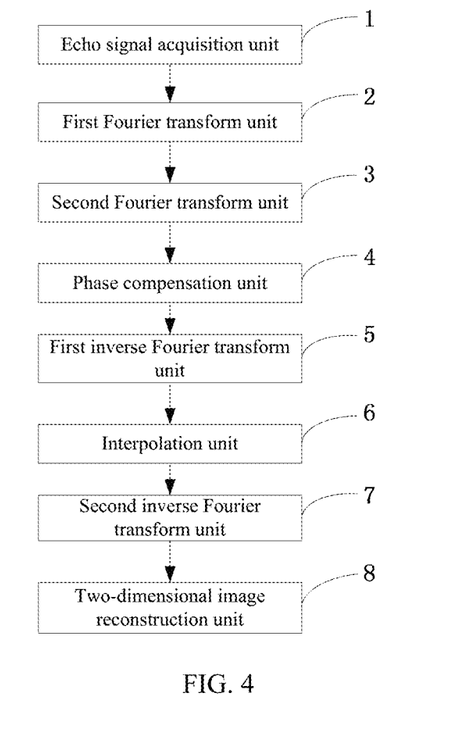
FIG. 4 is a schematic block diagram of a millimeter-wave three-dimensional holographic imaging system provided by an embodiment of the disclosure.

FIG. 4 is a schematic block diagram of a millimeter-wave three-dimensional holographic imaging system in accordance with an embodiment of the disclosure, and the system is used for implementing the method provided by the embodiment shown in FIG. 1. For convenience of explanation, only parts related to the present embodiment are shown.

As shown in FIG. 4, the millimeter-wave three-dimensional holographic imaging system provided by the present embodiment comprises:

an echo signal acquisition unit 1 for transmitting a continuous frequency wave to a measured human body by using a millimeter-wave antenna array, and receiving an echo signal $S(t, \theta, z)$ reflected back by the measured human body;

a first Fourier transform unit 2 for performing Fourier transform on the echo signal along a time direction to obtain an echo signal $S(\omega, \theta, z)$ in a frequency domain;

a second Fourier transform unit 3 for performing two-dimensional Fourier transform on the echo signal in the frequency domain along an angle $\theta$ and a vertical direction z to obtain an echo signal $S(\omega, \xi, k_z)$ in a spatial wave number domain;

a phase compensation unit 4 for performing phase compensation on the echo signal in the spatial wave number domain;

a first inverse Fourier transform unit 5 for performing one-dimensional inverse Fourier transform on the echo signal after the phase compensation along the $\theta$ direction to obtain sampling data in the spatial wave number domain;

an interpolation unit 6 for performing "non-uniform sampling to uniform sampling" interpolation on the sampling data in the spatial wave number domain to obtain echo data evenly distributed in the spatial wave number domain;

a second inverse Fourier transform unit 7 for performing three-dimensional inverse Fourier transform on the echo data evenly distributed in the spatial wave number domain to obtain three-dimensional echo data; and a two-dimensional image reconstruction unit 8 for projecting the three-dimensional echo data in a quasi standard deviation manner to obtain two-dimensional reconstruction data, and generating a two-dimensional image.

Optionally, the echo signal acquisition unit 1 is specifically used for:

transmitting the continuous frequency wave to the measured human body by using a millimeter-wave antenna array with a cylindrical synthetic aperture, and receiving the echo signal $S(t, \theta, z)$ reflected back by the measured human body.

Optionally, the phase compensation unit 4 is specifically used for:

multiplying the echo signal $S(\omega, \xi, k_z)$ in the spatial wave number domain by a phase compensation factor $\exp(-j\sqrt{4k_r^2R^2-\xi^2})$ to obtain a compensated echo signal, wherein R is a scanning radius of the millimeter-wave antenna array with the cylindrical synthetic aperture.

Optionally, the two-dimensional image reconstruction unit 8 is specifically used for:

if the continuous frequency wave transmitted to the measured human body by the millimeter-wave antenna array is a stepped frequency continuous wave signal, the number of frequency points is Nf, a scattering intensity signal of the measured target received at each frequency point by the nth antenna in the mth row in the millimeter-wave antenna array is $I_{mni}$, and the statistical average value of scattering intensity of millimeter-wave signals at corresponding frequency points by the human body is $\overline{I}_i$, then projecting a scattering intensity signal of the measured target received at each frequency point by the nth antenna in the mth row according to the following standard deviation projection formula:

$$I_{mn} = \sqrt{\frac{1}{Nf}\sum_{i=1}^{Nf}(I_{mn_i}-\overline{I}_i)^2} \;;$$

and combining $I_{mn}$ obtained by the projection of all antennas in the millimeter-wave antenna array to obtain the two-dimensional reconstructed image.

Figure 5:
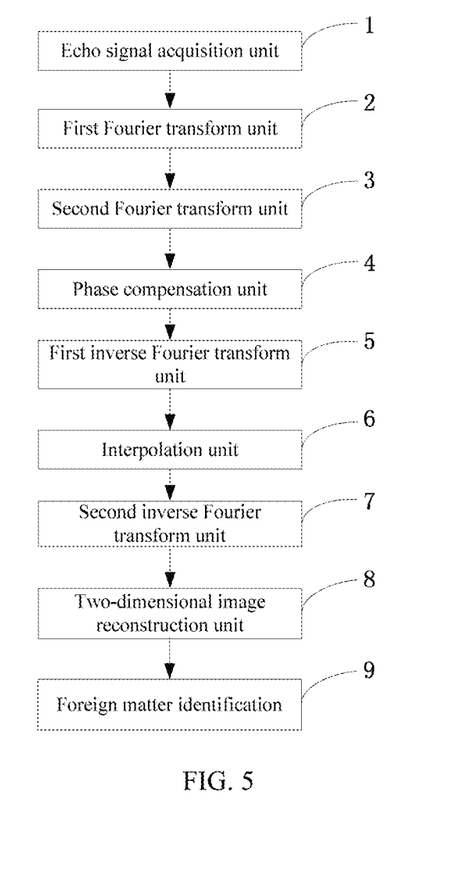
FIG. 5 is a schematic block diagram of a millimeter-wave three-dimensional holographic imaging system provided by another embodiment of the disclosure.

Optionally, as shown in FIG. 5, in another embodiment, the millimeter-wave three-dimensional holographic imaging system further comprises:

a foreign matter identification unit 9 for identifying whether the measured human body is carrying foreign matter according to the two-dimensional reconstructed image.

It should be noted that each unit in the above-mentioned terminal provided by an embodiment of the disclosure may have the same technical effect as an embodiment of the method of the disclosure because it is based on the same concept as the exemplary embodiment of the method of the disclosure. The specific content can be seen in the description of the exemplary embodiment of the method of the disclosure and will not be repeated here.

Therefore, it can be seen that the millimeter-wave three-dimensional holographic imaging system provided by an embodiment of the disclosure may also highlight the scattering characteristic information of banned items carried by the human body on the premise of weakening the scattering information of the human body, thus greatly reducing the missed detection rate of banned items.

The above description is not intended to limit the disclosure. Any modifications, equivalent substitutions, improvements, etc. made within the spirit and principles of the disclosure are within the scope of the disclosure.

What is claimed is:

1. A millimeter-wave three-dimensional holographic imaging method, comprising:

transmitting a continuous frequency wave to a measured human body by using a millimeter-wave antenna array, and receiving an original echo signal $S(t, \theta, z)$ reflected back by the measured human body;

performing Fourier transform on the original echo signal along a time direction to obtain a time transformed echo signal $S(\omega, \theta, z)$ in a frequency domain;

performing two-dimensional Fourier transform on the time transformed echo signal in the frequency domain along an angle $\theta$ and a vertical direction z to obtain a spatially transformed echo signal $S(\omega, \xi, k_z)$ in a spatial wave number domain;

performing phase compensation on the spatially transformed echo signal to obtain a phase compensated spatially transformed echo signal in the spatial wave number domain;

performing one-dimensional inverse Fourier transform on the phase compensated spatially transformed echo signal after the phase compensation along the θ direction to obtain sampling data in the spatial wave number domain;

performing non-uniform sampling to uniform sampling interpolation on the sampling data in the spatial wave number domain to obtain echo data evenly distributed in the spatial wave number domain;

performing three-dimensional inverse Fourier transform on the echo data evenly distributed in the spatial wave number domain to obtain three-dimensional echo data; and projecting the three-dimensional echo data in a quasi standard deviation manner to obtain two-dimensional reconstruction data, and to generate a two-dimensional image;

wherein the step of transmitting the continuous frequency wave to the measured human body by using the millimeter-wave antenna array, and receiving the original echo signal S(ω, θ, z) reflected back by the measured human body specifically comprises:

transmitting the continuous frequency wave to the measured human body by using a millimeter-wave antenna array with a cylindrical synthetic aperture, and receiving the original echo signal S(ω, θ, z) reflected back by the measured human body;

wherein the step of performing phase compensation on the spatially transformed echo signal to obtain a phase compensated spatially transformed echo signal in the spatial wave number domain specifically comprises:

multiplying the spatially transformed echo signal S(ω, ξ, $k_z$) in the spatial wave number domain by a phase compensation factor $\exp(-j\sqrt{4k_r^2R^2-\xi^2})$ to obtain the phase compensated spatially transformed echo signal, wherein R is a scanning radius of the millimeter-wave antenna array with the cylindrical synthetic aperture; and wherein the step of projecting the three-dimensional image in the quasi standard deviation manner to obtain the two-dimensional reconstructed image specifically comprises:

projecting a scattering intensity signal of the measured target received at each frequency point by the n th antenna in the m th row according to the following standard deviation projection formula:

$$I_{mn} = \sqrt{\frac{1}{N_f}\sum_{i=1}^{N_f}(I_{mn_i} - \overline{I_i})^2};$$

and combining $I_{mn}$ obtained by the projection of all antennas in the millimeter-wave antenna array to obtain the two-dimensional reconstructed image, wherein the continuous frequency wave transmitted to the measured human body by the millimeter-wave antenna array is a stepped frequency continuous wave signal, the number of frequency points is $N_f$, a scattering intensity signal of the measured target received at each frequency point by the n th antenna in the m th row in the millimeter-wave antenna array is $I_{mn_i}$ and the statistical average value of scattering intensity of millimeter-wave signals at corresponding frequency points by the human body is $\overline{I_i}$.

2. The millimeter-wave three-dimensional holographic imaging method of claim 1, wherein after projecting the three-dimensional image in the quasi standard deviation manner to obtain the two-dimensional reconstructed image, the method further comprises: identifying whether the measured human body is carrying foreign matter according to the two-dimensional reconstructed image.

3. A millimeter-wave three-dimensional holographic imaging system, comprising:

an echo signal acquisition unit for transmitting a continuous frequency wave to a measured human body by using a millimeter-wave antenna array, and receiving an original echo signal S(t, θ, z) reflected back by the measured human body;

a first Fourier transform unit for performing Fourier transform on the original echo signal along a time direction to obtain a time transformed echo signal S(ω, θ, z) in a frequency domain;

a second Fourier transform unit for performing two-dimensional Fourier transform on the time transformed echo signal in the frequency domain along an angle θ and a vertical direction z to obtain a spatially transformed echo signal S(ω, ξ, $k_z$) in a spatial wave number domain;

a phase compensation unit for performing phase compensation on the spatially transformed echo signal to obtain a phase compensated spatially transformed echo signal in the spatial wave number domain;

a first inverse Fourier transform unit for performing one-dimensional inverse Fourier transform on the phase compensated spatially transformed echo signal after the phase compensation along the θ direction to obtain sampling data in the spatial wave number domain;

an interpolation unit for performing non-uniform sampling to uniform sampling interpolation on the sampling data in the spatial wave number domain to obtain echo data evenly distributed in the spatial wave number domain;

a second inverse Fourier transform unit for performing three-dimensional inverse Fourier transform on the echo data evenly distributed in the spatial wave number domain to obtain three-dimensional echo data; and a two-dimensional image reconstruction unit for projecting the three-dimensional echo data in a quasi standard deviation manner to obtain two-dimensional reconstruction data, and generating a two-dimensional reconstructed image;

wherein the echo signal acquisition unit is specifically used for:

transmitting the continuous frequency wave to the measured human body by using a millimeter-wave antenna array with a cylindrical synthetic aperture, and receiving the original echo signal S(ω, θ, z) reflected back by the measured human body;

wherein the phase compensation unit is specifically used for:

multiplying the spatially transformed echo signal S(ω, ξ, $k_z$) in the spatial wave number domain by a phase compensation factor $\exp(-j\sqrt{4k_r^2R^2-\xi^2})$ to obtain the phase compensated spatially transformed echo signal, wherein R is a scanning radius of the millimeter-wave antenna array with the cylindrical synthetic aperture; and wherein the two-dimensional image reconstruction unit is specifically used for:

projecting a scattering intensity signal of the measured target received at each frequency point by the n th antenna in the m th row according to the following standard deviation projection formula:

$$I_{mn} = \sqrt{\frac{1}{N_f} \sum_{i=1}^{N_f} (I_{mn_i} - \overline{I_i})^2};$$

and combining $I_{mn}$ obtained by the projection of all antennas in the millimeter-wave antenna array to obtain the two-dimensional reconstructed image, wherein the continuous frequency wave transmitted to the measured human body by the millimeter-wave antenna array is a stepped frequency continuous wave signal, the number of frequency points is $N_f$, a scattering intensity signal of the measured target received at each frequency point by the n th antenna in the m th row in the millimeter-wave antenna array is $I_{mni}$ and the statistical average value of scattering intensity of millimeter-wave signals at corresponding frequency points by the human body is $\overline{I_i}$.

4. The millimeter-wave three-dimensional holographic imaging system of claim 3, further comprising:
a foreign matter identification unit for identifying whether the measured human body is carrying foreign matter according to the two-dimensional reconstructed image.

* * * * *

UNITED STATES PATENT AND TRADEMARK OFFICE
CERTIFICATE OF CORRECTION

PATENT NO. : 11,209,538 B2  
APPLICATION NO. : 16/327409  
DATED : December 28, 2021  
INVENTOR(S) : Shukai Zhao et al.

Page 1 of 1

It is certified that error appears in the above-identified patent and that said Letters Patent is hereby corrected as shown below:

On the Title Page

In item (73) Assignee, please correct the Assignee listing from -- SHENZHEN INSTITUTE OF TERAHERTZ AND INNOVATION, Shenzhen (CN) -- to -- CHINA COMMUNICATION TECHNOLOGY CO., LTD., Shenzhen (CN); SHENZHEN INSTITUTE OF TERAHERTZ TECHNOLOGY AND INNOVATION, Shenzhen (CN) --

Signed and Sealed this  
Twenty-fifth Day of July, 2023

Katherine Kelly Vidal  
*Director of the United States Patent and Trademark Office*